United States Patent [19]

Povilaitis

[11] Patent Number: 5,022,242
[45] Date of Patent: Jun. 11, 1991

[54] ADJUSTABLE LOCK FOR A CASSETTE TAPE PLAYER

[75] Inventor: Darius A. Povilaitis, Lemont, Ill.

[73] Assignee: Calibro Corporation, Lemont, Ill.

[21] Appl. No.: 567,621

[22] Filed: Aug. 15, 1990

[51] Int. Cl.⁵ .............................................. B65D 55/14
[52] U.S. Cl. ........................................ 70/14; 70/58; 70/158; 70/163; 70/168
[58] Field of Search ............... 70/14, 57, 58, 158–173, 70/432, 455

[56] References Cited

U.S. PATENT DOCUMENTS

| | | | |
|---|---|---|---|
| 1,774,307 | 8/1930 | Willig | 70/168 |
| 2,363,567 | 11/1944 | Blakeman | 70/168 X |
| 2,693,100 | 11/1954 | Wiegel | 70/168 |
| 4,066,307 | 1/1978 | Barding | 70/58 X |
| 4,131,001 | 12/1978 | Gotto | 70/432 X |
| 4,228,746 | 10/1980 | Caton | 70/168 X |
| 4,280,226 | 7/1981 | Jenkins | 70/158 X |
| 4,527,405 | 7/1985 | Renick et al. | 70/58 X |
| 4,577,478 | 3/1986 | Economopoulos | 70/168 |
| 4,640,106 | 2/1987 | Derman | 70/58 X |
| 4,908,728 | 3/1990 | Pinkett | 70/163 X |

Primary Examiner—Robert L. Wolfe
Assistant Examiner—Suzanne L. Dino
Attorney, Agent, or Firm—Wood, Phillips, Mason, Recktenwald & VanSanten

[57] ABSTRACT

An adjustable lock for a cassette tape player for preventing the theft and unauthorized use of the cassette tape player is disclosed. The adjustable lock comprises a housing mounted outside of a tape receiving chamber. The housing has a hook extending rearwardly and laterally outwardly therefrom so as to be insertable into one end of the tape slot in the cassette tape player and a bolt extending rearwardly and laterally outwardly from the housing whereby the engaging end of the bolt is insertable into the end of a tape slot opposite the hook. The adjustable lock also includes a tubular key lock assembly which mounted on the face of the housing is operationally associated with the bolt. In particular, the tubular key lock assembly is adapted to extend or retract the bolt by a distance rearwardly from the housing which is adjustable.

7 Claims, 1 Drawing Sheet

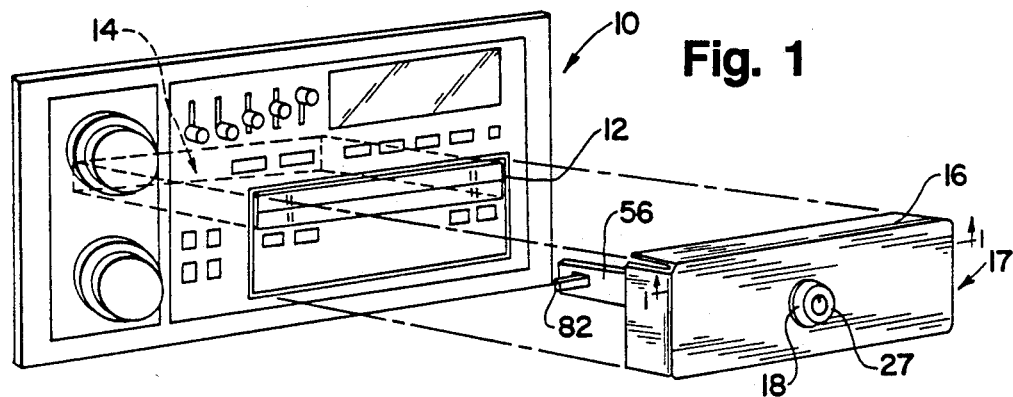
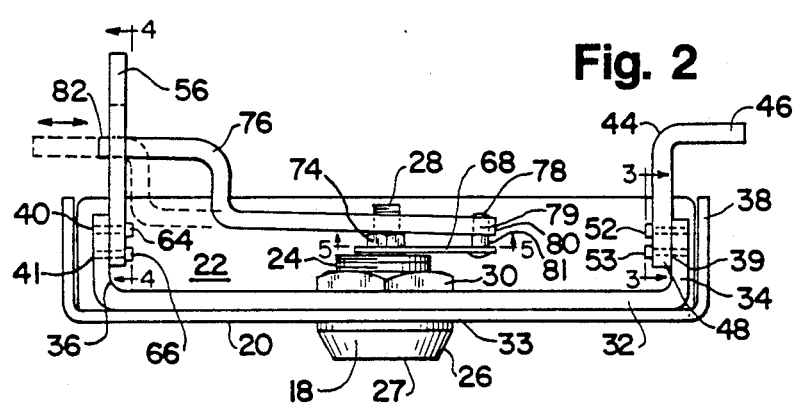
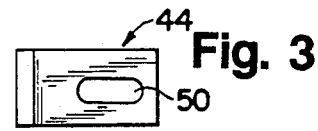
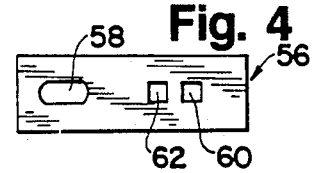
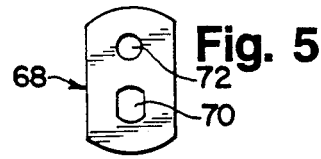
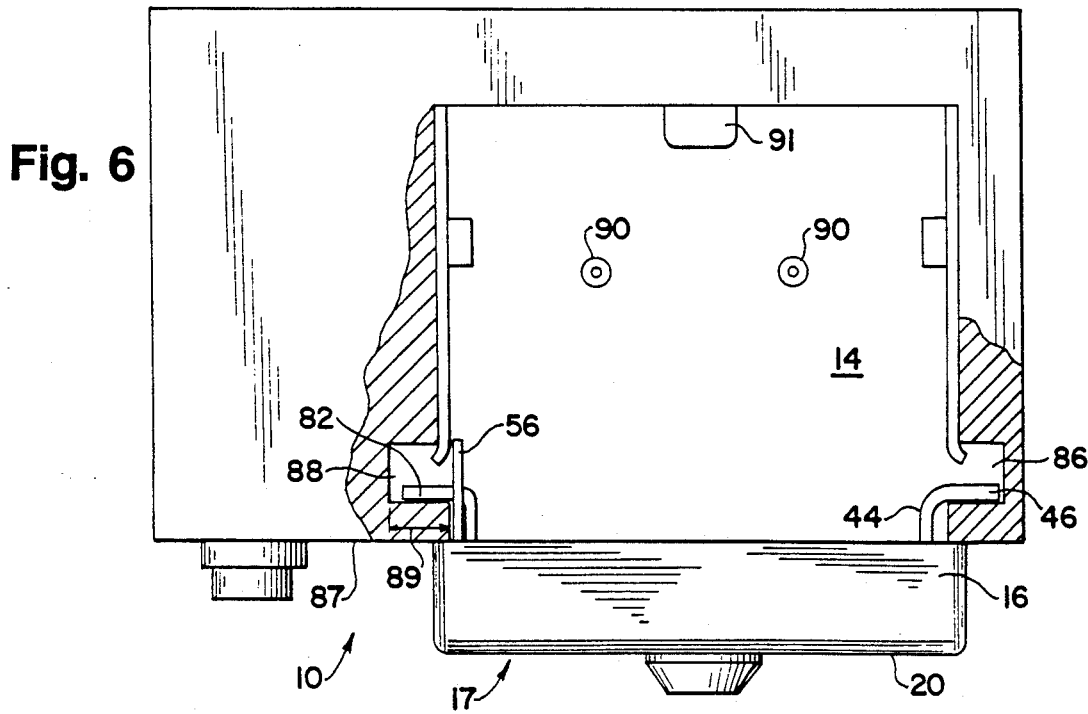

ADJUSTABLE LOCK FOR A CASSETTE TAPE PLAYER

BACKGROUND OF THE INVENTION

The present invention is directed toward a lock for a cassette tape player, and more particularly toward an adjustable lock for deterring the theft and unauthorized use of a cassette tape player.

Security locks for cassette tape players are well known in the art. These locks generally involve a housing containing a key driven locking mechanism. The housing is either partially or entirely insertable into a tape receiving chamber of a cassette tape player through a tape slot in the cassette tape player case. The housing is then secured within the tape slot by turning the key driven mechanism and thereby actuating pivotable links or bars which engage either the tape mechanism or the walls surrounding the cassette receiving chamber.

More particularly, U.S. Pat. No. 4,527,405 discloses a security lock for cassette recorders and cassette tape players comprising a body having an exterior portion of dimensions large enough to prevent the exterior portion from entering the tape slot and an interior portion having dimensions suitable to allow its insertion into the tape receiving chamber. A pivotable link means is disposed within the interior portion of the body to expand outwardly to engage an interior wall of the tape receiving chamber upon the turning of a lock disposed within the exterior portion of the body.

U.S. Pat. No. 4,131,001 discloses a security lock for a cassette tape player comprising a body of rectangular configuration which is fully insertable into the tape receiving chamber allowing only a side wall containing a key driven lock to remain accessible through the tape slot. When the key driven lock is actuated, locking bars operationally associated with the key driven lock are caused to extend and retract relative to the housing for engaging and releasing the side walls of the tape receiving chamber.

U.S. Pat. No. 4,640,106 discloses a lock for preventing unauthorized use of a cassette tape deck comprising a U-shaped member insertable into the tape receiving chamber and having a central opening therein and a transverse member connecting the ends of the U-shaped member dimensioned greater than the tape slot. Disposed within the central opening is an element for engaging the interior of the cassette receiving chamber which is rotationally associated with a key driven lock disposed within the transverse member.

The cassette tape player lock disclosed by the '405 patent (the '405 security lock) is of limited utility because it is difficult to use. With each use of the '405 security lock the key driven lock must be rotated to extend the pivotable links the appropriate amount. Every time this operation is repeated it must be conducted with a great deal of care because forcibly turning the key driven lock could result in damage to the tape deck if the pivotable links are extended too far. A related problem is that the time consumed in installing the '405 security lock discourages cassette player owners from consistently using the device. Lastly, because a portion of the housing is inserted within the tape receiving chamber, there is danger that the tape drive mechanism may be damaged if the housing is not inserted into the tape receiving chamber with great care.

The fact that the tape player lock disclosed in the '001 patent (the '001 security lock) is fully insertable into the cassette tape chamber also presents serious problems. First, there is a substantial danger of damaging the tape drive mechanism if the housing is not carefully inserted within the tape receiving chamber. Second, the '001 security lock is not readily adaptable to cassette tape players having tape receiving chambers of different configurations. Thus, consumers are likely to find a device built according to the '001 disclosure could not be adapted to fit their particular cassette tape player. Finally, the locking device is not readily visible from outside the driver's compartment meaning that a prospective thief would have to break into the driving compartment and examine the tape slot before discovering that the locking device was disposed therein.

The locking device disclosed by the '106 patent (the '106 security lock) also has a body portion insertable into the tape receiving chamber creating the possibility of damage to the tape drive mechanism. In addition, the '106 security lock has been found unsuitable for use with certain cassette tape players, specifically those manufactured by the General Motors Corporation.

The present invention is directed toward overcoming one or more of the problems discussed above.

SUMMARY OF THE INVENTION

It is an object of the invention to provide a security lock for cassette tape players which is adjustable to fit cassette tape players with tape receiving chambers of varying configurations by engaging the tape receiving chamber away from the tape drive mechanism.

In one aspect of the present invention an adjustable lock for deterring the theft and the unauthorized use of a cassette tape player having a tape drive mechanism comprises a housing mountable outside of a tape receiving chamber in the cassette tape player. The housing has a recess which, when mounted, faces the tape receiving slot of the cassette tape player. The recess is defined by a front wall and side walls of the housing, the front wall being of a size sufficient to prevent insertion of the housing into the tape receiving chamber. A hook extends rearwardly and laterally outwardly of the recess in the housing. The free end of the hook is insertable into one end of the tape slot for engaging an inside wall of the cassette tape player case. A locking means is mounted on the front of the housing and is attached to a bolt having an engaging and non-engaging end. The engaging end of the bolt is laterally retractably extendable from the housing and insertable into the end of the tape slot opposite the free end of the hook for engaging the inside wall of the cassette tape player case when extended. Means for attaching the bolt to the locking means are disposed within the recess whereby the bolt may be extended and retracted by actuation of the lock. A guide for directing the bolt to engage the inside wall of the case of the cassette tape player extends rearwardly from the housing. The depth at which the hook and the bolt may be inserted into the tape receiving chamber is adjustable.

Still other aspects, objects and advantages of the present invention can be obtained from a study of the specification, the drawings, and the appended claims.

BRIEF DESCRIPTION OF THE DRAWINGS

FIG. 1 is a perspective view of an adjustable lock for a cassette tape player according to the invention indicating how the adjustable lock is disposed upon a cassette tape player;

FIG. 2 is a cutaway top view of an adjustable lock for a cassette tape player according to the invention taken along line 1—1 of FIG. 1;

FIG. 3 is a plan view of the hook of FIG. 2 taken along line 3—3 of FIG. 2;

FIG. 4 is a plan view of the bolt guide of FIG. 2 taken along line 4—4 of FIG. 2;

FIG. 5 is a plan view of the cam of FIG. 2 taken along line 5—5 of FIG. 2; and

FIG. 6 is a cutaway view of an adjustable lock according to the invention disposed within a cassette tape player.

DETAILED DESCRIPTION OF THE PREFERRED EMBODIMENT

Referring to FIGS. 1 and 6, a cassette tape player 10 is shown having a tape slot 12 and a tape receiving chamber 14. Shown disposed outwardly of the tape receiving chamber 14 is an adjustable lock housing 16 of an adjustable lock 17 and a tubular key lock 18 mounted thereto according to the invention. The front wall 20 of the housing 16 is of greater length and width than the tape slot 12.

Referring to FIG. 2, the housing 16 defines an inner recess 22. Disposed upon the front wall of the housing 20 is the tubular key lock 18.

The tubular key lock 18 has a threaded casing 24 with an annular flange 26 encircling a keyhole 27. A non-circular threaded shaft 28 extends from the end of the threaded casing 24 opposite the keyhole 27. The non-circular threaded shaft 28 is connected to the locking mechanism within the threaded casing 24 in conventional fashion. Thus, when a key is inserted in the keyhole 27 and the key is rotated, the non-circular threaded shaft 28 rotates in a like manner.

The tubular key lock 18 is mounted on the front wall of the housing 20 such that the annular flange 26 extends from the front wall of the housing 20 and the threaded casing 24 extends into the inner recess 22 of the housing 16. A bracket 32 is disposed within the recess 22. The bracket 32 contains a hole 33 which fits around the threaded casing 24. The tubular key lock 18 and the bracket 32 are secured in place by means of a nut 30 which threadably engages the threaded casing 24.

Disposed on opposite ends of the bracket 32 are a first support arm 34 and a second support arm 36. The first support arm 34 and the second support arm 36 are spaced apart approximately the width of the tape slot 12. Two collinear threaded holes 38, 39 and 40, 41 are contained in each support arm.

A hook 44 having a free end 46 and an attaching end 48 is disposed on the first support arm 34 and as shown more clearly in FIG. 3, an elongated slot 50 is formed in the attaching end 48. Referring once again to FIG. 2, the hook 44 is attached to the first support arm 34 by two screws 52 and 53 which extend through the slot 50 and threadably engage the threaded holes 38 and 39.

A bolt guide 56 is disposed upon the second support arm 36 and, as shown more clearly in FIG. 4, the bolt guide 56 contains an elongated slot 58 in one end and first and second guide holes 60 and 62 in the other end thereof. Referring once again to FIG. 2, the bolt guide 56 is attached to the second support arm 36 by two screws 64 and 66 which extend through the elongated slot 58 and threadably engage the threaded holes 40 and 41.

As will be appreciated by referring to FIGS. 2 and 5, a pivotable link 68 is disposed upon the non-circular threaded shaft 28 and contains a first non-circular hole 70 and a second circular hole 72. The first hole 70 is of a configuration to engage the non-circular threaded shaft 28 such that when the non-circular threaded shaft 28 rotates the pivotable link 68 rotates in a like manner. The pivotable link 68 is secured to the non-circular threaded shaft 28 by a nut 74 that threadably engages the non-circular threaded shaft 28.

A bolt 76 is pivotably fastened to the pivotable link 68 by means of a rivet 78 passing through a hole 79 in the non-engaging end 80 of the bolt 76 and the second hole 72 in the pivotable link 68. In the preferred embodiment, a spring spacer 81 is disposed intermediate the bolt 76 and the pivotal link 68.

The bolt 76, as viewed in FIG. 2, is of step-like configuration with the non-engaging end 80 of the bolt 76 forming one of the steps and the engaging end 82 of the bolt 76 forming the other of the steps which passes through either the first guidehole 60 or the second guidehole 62.

In the preferred embodiment the tubular key lock is constructed such that the key may be withdrawn from the keyhole 27 at various points along the rotational path of the tubular key lock. As appreciated by those skilled in the art, this feature allows the distance the bolt 76 laterally extends from the housing 20 to be varied.

The operation of the adjustable lock 17 described above is best understood by reference to FIG. 6 wherein the free end 46 of the hook 44 engages the first lateral space 86 behind the face 87 of the cassette tape player 10. The engaging end 82 of the bolt 76 may then engage the second lateral space 88 behind the face 87 when the adjustable lock housing 16 is flushly mounted to the face 87 of the cassette tape player 10 and a key is inserted into the keyhole 27 of the tubular key lock 18 and rotated thereby causing the non-circular threaded shaft 28 to turn. As will be appreciated, this causes the pivotable link 68 to rotate about the non-circular threaded shaft 28, and thereby causes the engaging end 82 of the bolt 76 to extend into the second lateral space 88. Because the key may be withdrawn at different points along the rotational path of the tubular key lock 18, the length the bolt 76 laterally extends may be varied to accomodate second lateral spaces 88 of varying depths 89 without harming the cassete tape player 10.

Depending upon the interior configuration of the tape receiving chamber 14, the first lateral space 86 and the second lateral space 88 may be disposed at different distances from the face 87 of the cassette tape player 10. To accommodate these differences, the hook 44 may be extended or retracted relative to the front of the housing 20 by loosening the screws 52 and 53 and slidably adjusting the extension of the hook 44 as appropriate. Similarly, the depth at which the engaging end 82 of the bolt 76 penetrates into the tape receiving chamber 14 to engage the second lateral space 88 can be altered by loosening the screws 64 and 66 and slidably adjusting the extension of the bolt guide 56 or passing the bolt 76 through either of the first and second guideholes 60 and 62. When all such adjustments are made to the bolt 76, the spring spacer 81 allows the bolt 76 to pivot relative to the pivotable link 68 so that it may still be extended and retracted relative to the front wall of the housing 20.

From the foregoing, it will now be fully appreciated that the hook 44, the bolt guide 56 and the bolt 76 may be independently adjusted for accommodating a wide variety of cassette tape players.

As seen in FIG. 6, because the free end of the hook 46 and the bolt guide 56 and engaging end of the bolt 82 need only be inserted into the tape receiving chamber 14 a distance sufficient to engage the first lateral space 86 and the second lateral space 88, the adjustable cassette tape player lock disclosed herein does not engage or even approach contact with the tape drive gears 90 or play head 91.

As is evident from the foregoing, the invention described herein provides an adjustable lock for cassette tape players 10. It does this in an entirely unique manner wherein a single adjustable lock will work with tape receiving chambers 14 of varying configurations without engaging or even approaching contact with the tape drive gears 90 or play head 91. In addition, the housing 16 provides a visible deterrent to would be thieves by virtue of the fact that it extends external to the cassette tape player 10.

While in the foregoing there has been set forth a preferred embodiment of the invention, it will be appreciated that the details herein given may be varied by those skilled in the art without departing from the true spirit and scope of the appended claims.

I claim:

1. An adjustable lock for deterring the theft and unauthorized use of a cassette tape player having tape drive gears and a play head comprising:
   a housing mountable outside of a tape slot accessing a tape receiving chamber in a case of the cassette tape player, the housing when mounted having a recess facing the cassette tape player, the recess being defined by a front wall and side walls of the housing, the front wall being large enough to prevent insertion of the housing into the tape receiving chamber;
   a hook extending rearwardly and laterally outwardly of the housing with a free end being insertable into one end of the tape slot for engaging an inside wall of the tape receiving chamber;
   a locking means mounted on the front wall of the housing extending into the recess, the locking means being operatively accessible from outside the housing;
   a bolt having an engaging and a non-engaging end, the engaging end being laterally retractably extendable from the housing and insertable into the end of the tape slot opposite the free end of the hook for engaging an inside wall of the tape receiving chamber when extended;
   means attaching the bolt to the locking means so that when the locking means is in an unlocked position the bolt is in a retracted position and when the locking means is in a locked position the bolt is in a laterally extended position;
   means guiding the bolt to engage the inside wall of the tape receiving chamber opposite the free end of the hook when the bolt is in a laterally extended position and to release the inside wall when the bolt is in a retracted position;
   means for adjusting the depth at which the free end of the hook may be inserted into the tape receiving chamber for engaging the inside wall of the tape receiving chamber; and
   means for adjusting the depth at which the bolt may be laterally extended into the tape receiving chamber for engaging the inside wall of the tape receiving chamber.

2. The adjustable lock of claim 1 wherein the locking means includes a tubular key lock.

3. The adjustable lock of claim 2 wherein the bolt attaching means comprises a shaft rotatably associated with the tubular key lock and a pivotable link mounted to the shaft, the non-engaging end of the bolt being pivotably mounted to the pivotable link away from the shaft, whereby when the tubular key lock is rotated the shaft is rotated causing the pivotable link to rotate and thereby causing the bolt to extend or retract laterally relative to the housing.

4. The adjustable lock of claim 3 wherein the tubular key lock may be rotated to a plurality of positions whereby the distance the bolt is laterally extended relative to the housing may be varied.

5. The adjustable lock of claim 3 wherein a spring spacer is disposed between the non-engaging end of the bolt and the pivotable link.

6. The adjustable lock of claim 1 wherein the free end of the hook and the engaging end of the bolt engage the inside wall of the tape receiving chamber away from the tape drive gears and play head.

7. The adjustable lock of claim 1 wherein the depth adjusting means for the hook and the bolt comprises:
   a bracket attached to the front wall inside the recess to extend laterally along the front wall inside the recess;
   a first and a second support arm integrally associated with opposite ends of the lateral extent of the bracket spaced apart by approximately the width of the tape slot;
   the hook being slidably associated with the first support arm at a point remote from the free end thereof and the bolt for guiding the means being slidably associated with the second support arm, whereby the free end of the hook and the bolt guiding means may be extended and retracted rearwardly and forwardly relative to the front wall of the housing; and
   means for securing the hook and the bolt for guiding means in a fixed position relative to the front wall of the housing.

* * * * *